Patented Aug. 30, 1932

1,875,013

UNITED STATES PATENT OFFICE

OSCAR KASELITZ, OF BERLIN, GERMANY

METHOD OF PRODUCING COMPOUNDS OF THE CARNALLITE TYPE

No Drawing. Application filed October 18, 1930, Serial No. 489,712, and in Germany November 28, 1929.

My invention relates to a method of producing compounds of the carnallite type having the formula $KCl.MgCl_2 + 6H_2O$ or $NH_4Cl.MgCl_2 + 6H_2O$, hereinafter called potassium carnallite and ammonium carnallite, respectively. It is one of the objects of this invention to provide means whereby these compounds or a mixture thereof can be produced in a simpler and more efficient manner than was hitherto possible.

German Patent No. 391,362 discloses a method of producing anhydrous magnesium chloride from ammonium carnallite by drying this starting material until substantially all the water of crystallization is expelled, and thereafter heating it in a current of evaporated ammonium chloride until the ammonium chloride contained in the carnallite is expelled also. While the residue from this operation consists of substantially anhydrous magnesium chloride, there are obtained vapors of water and ammonium chloride, and these vapors are absorbed by bringing them in contact with a concentrated solution of magnesium chloride, preferably in the form of so-called "foots", i. e., the usually discarded mother liquors from the manufacture of potassium salts from Stassfurth salts.

On cooling the absorption liquor, part of the absorbed ammonium chloride is recovered in the form of fresh amounts of ammonium carnallite, which may be reused in the production of anhydrous magnesium chloride.

A similar method is disclosed in German specification No. 395,510 which describes the production of mixtures of anhydrous magnesium chloride and of potassium chloride such as required in the electrolytic production of metallic magnesium. In accordance with this process potassium carnallite, which may be mixed with ammonium carnallite and/or magnesium chloride and/or alkali chlorides, is heated, preferably after having been mixed with solid ammonium chloride, in a current of ammonium chloride vapors so as to obtain a residue consisting of anhydrous magnesium chloride and alkali chlorides. The carnallites required in this process are obtained from concentrated magnesium chloride solutions, or preferably from foots of the kind aforesaid, by adding hereto potassium chloride or magnesium chloride and allowing the carnallite to crystallize out.

The question how to utilize the mother liquor resulting in these processes after the ammonium carnallite and the potassium carnallite, respectively, have been separated out has not yet been answered although the high price commanded by the ammonium and potassium salts renders a utilization of this mother liquor rather important. One might expel the ammonia by heating the mother liquor with lime, the residual liquors being discarded or the mother liquor might be mixed with solutions of magnesium chloride and ammonium chloride, and evaporated until on cooling fresh amounts of ammonium carnallite crystallize out.

In contradistinction to this process, which requires heat energy, the present invention affords the means for reutilizing these mother liquors without requiring heating.

According to this invention I mix the mother liquor with the molten magnesium chloride hexahydrate and ammonium chloride; on this mixture cooling down ammonium carnallite will crystallize out. Alternatively I cause the mother liquor to react with commercial crystallized magnesium chloride and ammonium chloride to form ammonium carnallite.

Both products required for these reactions, the molten magnesium chloride hexahydrate as well as the crystallized magnesium chloride, can easily be recovered from the foots of the potassium salt manufacture and can thus be converted in a commercial manner into ammonium carnallite serving for producing anhydrous magnesium chloride. It will be noted that in accordance with my invention the magnesium chloride hexahydrate is used in a crystallized state, be it in the form of solid crystals or in the form of a melt, but at any rate not in solution. I thus avoid the mother liquor being diluted with additional amounts of water other than water of crystallization as well as an additional concentrating operation necessitated by such an introduction of water.

In a similar manner potassium chloride and crystallized magnesium chloride hexahydrate, either molten or solid, can be added to mother liquors containing potassium carnallite or ammonuim carnallite in order to recover potassium carnallite.

A mixture of the two double salts can be obtained in an analogous manner.

*Example 1*

To 1000 parts by weight of the mother liquor obtianed at 25° C. according to the process disclosed in German Patent No. 395,510, which contained 87 parts ammonium chloride and 210 parts magnesium chloride, 200 parts molten magnesium chloride hexahydrate having a temperature of 125° C. and 53 parts ammonium chloride were added under stirring. After cooling down to 25° C. 255 parts ammonium carnallite were obtained (apart from the mother liquor adhering to the salt).

*Example 2*

To 1000 parts of the mother liquor obtained at 25° C. according to the method disclosed in German Patent No. 391,362, were added 200 parts crystallized magnesium chloride hexahydrate and 53 parts ammonium chloride and the mixture was stirred during one hour. Apart from the mother liquor adhering to the crystals, 248 parts ammonium carnallite were obtained.

Wherever the expression "crystallized magnesium chloride hexahydrate" is used in the claims affixed to this specification, it is intended to designate the solid crystals or the melt obtained by fusing them, to the exclusion of liquids containing materially more water than corresponds to the ratio $$1MgCl_2 : 6H_2O.$$

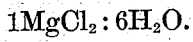

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing a double salt of the carnallite type comprising adding to a mother liquor containing such compound crystallized magnesium chloride hexahydrate and the chloride of the other basic constituent of the double salt, allowing the double salt to crystallize out and reusing the mother liquor in a fresh operation.

2. The method of producing a double salt of the carnallite type comprising adding to a mother liquor containing such compound crystallized magnesium chloride hexahydrate in a molten state and the chloride of the other basic constituent of the double salt, allowing the double salt to crytallize out and reusing the mother liquor in a fresh operation.

3. The method of producing a double salt of the carnallite type comprising adding to a mother liquor containing such compound solid crystallized magnesium chloride hexahydrate and the chloride of the other basic constituent of the double salt, allowing the double salt to crystallize out and reusing the mother liquor in a fresh operation.

4. The method of producing ammonium carnallite comprising adding to a mother liquor containing ammonium carnallite solid crystallized magnesium chloride hexahydrate and ammonium chloride under stirring, allowing the double salt to crystallize out and reusing the mother liquor in a fresh operation.

5. The method of producing ammonium carnallite comprising adding to a mother liquor containing ammonium carnallite crystallized magnesium chloride hexahydrate in a molten state and ammonium chloride under stirring, allowing the double salt to crystallize out and reusing the mother liquor in a fresh operation.

6. The method of producing ammonium carnallite comprising adding to a mother liquor containing ammonium carnallite solid crystallized magnesium chloride hexahydrate and ammonium chloride under stirring, allowing the double salt to crystallize out and reusing the mother liquor in a fresh operation.

7. The method of producing potassium carnallite comprising adding to a mother liquor containing potassium carnallite crystallized magnesium chloride hexahydrate in a molten state and potassium chloride under stirring, allowing the double salt to crystallize out and reusing the mother liquor in a fresh operation.

8. The method of producing potassium carnallite comprising adding to a mother liquor containing potassium carnallite crystallized magnesium chloride hexahydrate and potassium chloride under stirring, allowing the double salt to crystallize out and reusing the mother liquor in a fresh operation.

9. The method of producing potassium carnallite comprising adding to a mother liquor containing potassium carnallite solid crystallized magnesium chloride hexahydrate and potassium chloride under stirring, allowing the double salt to crystallize out and reusing the mother liquor in a fresh operation.

In testimony whereof I affix my signature.

OSCAR KASELITZ.